Patented Aug. 1, 1933

1,920,324

UNITED STATES PATENT OFFICE 1,920,324

DYE COMPOUNDS AND PROCESS OF PRODUCING SAME

Albert H. Schmidt, Palatine, Ill.

No Drawing. Application August 2, 1930
Serial No. 472,758

7 Claims. (Cl. 8—6.)

This invention has to do with the preparation of dyes to render them water insoluble, in particular, relates to a process whereby dyestuffs such as synthetic organic dyes which by themselves are soluble in water are transformed into compounds that retain all the coloring qualities of the dyestuffs and have the added advantage of becoming insoluble in water after application.

More specifically stated, synthetic dyestuffs which are soluble in water or in a solution of alcohol in water, are dissolved and then combined with a fixative of ammonium resinate containing a sulphonated oil to form a dye which becomes fast on cellulose products and textiles and will not bleed or leach out with water.

One of the important objects of the invention is to provide a fixative that will combine with water soluble synthetic organic dyestuffs to render the same insoluble in water after application, thereby enlarging the field of usefulness for such dyestuffs and making possible the coloring of products that by reason of the nature of their use heretofore have been left undecorated for want of a suitable water fast dye.

In order that the invention may be fully understood I shall cite two examples of procedure that may be followed for the production of my water insoluble dyes. For the first we shall assume that a dye is required for coloring a wood pulp product or a box-board. Such materials require a slow penetration of the dye to give a uniform coloring.

The fixative for this requirement is made by dissolving 100 parts of a high grade coarsely ground or broken rosin, in 100 parts of denatured alcohol. Occasional stirring or agitation will aid the solution, but beyond this it is not necessary to pay any attention to this step of the process, which takes approximately 10 hours. When the rosin has been completely dissolved, 30 parts of a 25% solution of ammonium hydroxide are added to the rosin solution, preferably by pouring in a thin stream and thoroughly stirring. This forms an alcoholic solution of ammonium resinate or ammonium abietate. After the heat of the reaction has been dissipated, 70 parts of a high grade 75% sulphonated castor oil are added to the resinate, with thorough stirring, and then sufficient water is added to bring the volume to 300 parts.

10 parts of the fixative thus formed are poured into 90 parts of soft water. If the solution is inclined to be cloudy add just enough ammonium hydroxide to clear it up. Now take 20 parts of a 2% solution of a basis synthetic organic dyestuff dissolved in a 50% solution of alcohol in water and add to the 100 parts of water and fixative. Stir thoroughly and the resulting dye solution is ready for use. Application can be made by dipping, spraying, calendar staining or any other desired method. The dyed product may be air or heat dried.

Let us now assume that a dye with quicker penetrating properties is desired, as for use on higher grade papers, on textiles, etc.

For the fixatives I take 100 parts of rosin to 200 parts of denatured alcohol and proceed as in the first case except that the final volume of the fixative is brought up to 400 parts by the addition of water.

10 parts of this second fixative is added to 40 parts of soft water and then the dyestuff is added, this time, 10 parts of a 4% solution of basic dyestuff being dissolved in 50% denatured alcohol.

Any of the commercial basic dyestuffs are suitable for use in carrying out the process of the invention. As typical examples of such basic dyes I cite Victoria blue, malachite green and auramine, which dyes are identified by color index Nos. 729, 657 and 655, respectively.

The invention is not limited however to the use of basic dyestuffs as I have used successfully direct dyestuffs, such as direct black E. A., color index No. 582, and acid dyestuffs, such as brilliant wool blue, color index No. 733, and brilliant indocyamine, a new color which has not as yet been placed in the color index. When using direct or acid dyestuffs the same must be dissolved in water rather than in a solution of alcohol in water. Alcohol materially decreases the solubility of the direct and acid dyes.

Wide latitude is permissible in the selection of the reagents used in carrying out the process of the invention. For instance, it is not necessary to use denatured alcohol in the preparation of the fixative as methyl or ethyl alcohol, or any other monohydric aliphatic alcohol capable of dissolving resins or gums to render the same soluble or emulsifiable with water upon treatment with ammonium hydroxide, will satisfy all the requirements of the process. Likewise polyhydric aliphatic alcohols or their derivatives or substitutes having the same capacity to dissolve resins or gums may be employed. It is not even necessary to use alcohols of any kind as the fixatives can be prepared by the use of aldehydes, for example furfuraldehyde, or by use of ketones, as for example, acetone, or by using hydrogenated aryl phenols, of which tetraline and hexaline are examples. The ultimate requirement of the preparation of the fixative is that a clear solution of ammonium resinate shall result.

The invention is not restricted to the quantities or proportions of the ingredients specified for use in preparing the fixatives, as these proportions may be varied, with the exception that the ratio of ammonium hydroxide must not fall below that required to convert all of the rosin into ammonium resinate. Should an excess of ammonium hydroxide be added, no harm results.

In the foregoing examples I have specified the use of rosin but any resin or resin gum, or synthetic resin or any condensation product that is capable of being dissolved wholly or partly in an alcohol, aldehyde or a ketone and becoming completely soluble or emulsifiable in water upon treatment with ammonium hydroxide, may be used in place of the rosin.

While I find that the best results are obtained by the use of ammonium hydroxide for saponification of the resins or gums dissolved in various solvents, the invention is not restricted to the use of ammonium hydroxide as many of the alkylamines or arylamines and their derivatives have the same capacity.

The addition of the sulphonated castor oil as called for in the foregoing examples is for the purpose of aiding the penetration of the dyestuff solution and assisting in physically and probably chemically fixing the compound to the objects that are to be dyed or colored. Other sulphonated oils, fats or hydrocarbons capable of forming a solution or an emulsion in water, with or without the addition of a weak alkali, may be used in place of the castor oil. Within the scope of the invention many other modifications, substitutions and alternative treatments may be practiced in the accomplishment of the objects of the invention.

The water insoluble dyes thus formed from synthetic dyestuffs provide the means of making possible the attractive and durable coloring of low-priced boxes, papers, wrappers, cartons, textiles, wood surfaces, products, etc., that heretofore have not been subject to decoration with water insoluble colors. The new compounds may also be used for higher priced and quality articles as the transformation into the insoluble state does not detract from the brilliance or durability of the original dyestuff.

In the accompanying claims the terms used to designate the ingredients used in carrying out the steps of the invention and in defining the product are meant to include all substitute and equivalent materials for accomplishing the same result.

I claim:

1. The process of preparing a dyeing composition, which comprises forming an alcoholic solution of amomnium resinate, and combining with said solution a solution of a water-soluble synthetic organic dye capable of reacting therewith to form a water insoluble color when dry.

2. A coloring process, which comprises forming an alcoholic solution of ammonium resinate and a sulfonated oil, mixing therewith a solution of a water-soluble synthetic organic dye, treating the material to be colored with said mixture, and drying the treated material.

3. A coloring process, which comprises forming an alcoholic solution of a water-soluble synthetic organic dye and ammonium resinate to form therewith a water insoluble color product when dry, treating the material to be colored with said solution, and drying the treated material.

4. The process of preparing a dyeing composition, which comprises forming an alcoholic solution of a resin compound, adding thereto a solution of amomnium hydroxide to form an alcoholic solution of ammonium resinate, mixing with said solution of ammonium resinate sulfonated castor oil, and adding to said mixture a solution of a water soluble synthetic organic dye.

5. A dyeing composition, comprising an alcoholic solution containing ammonium resinate, and a basic water-soluble synthetic organic dye.

6. A dyeing composition, comprising an alcoholic solution of a water soluble synthetic organic dye, ammonium resinate and a sulfonated oil.

7. A dyeing composition, comprising a volatile alcoholic solution of the saponification product of a resin compound and a volatile ammonia type base, and a solution of a water-soluble synthetic organic dye capable of reacting with said saponification product to form an insoluble color product when dry.

ALBERT H. SCHMIDT.